United States Patent
Nicholson et al.

(10) Patent No.: US 7,340,638 B2
(45) Date of Patent: Mar. 4, 2008

(54) OPERATING SYSTEM UPDATE AND BOOT FAILURE RECOVERY

(75) Inventors: Clark Nicholson, Seattle, WA (US); Jason Anderson, Snoqualmie, WA (US); Serdar Unal, Bellevue, WA (US); Wes Witt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 10/354,387

(22) Filed: Jan. 30, 2003

(65) Prior Publication Data

US 2004/0153724 A1    Aug. 5, 2004

(51) Int. Cl.
*G06F 11/00* (2006.01)
(52) U.S. Cl. .............................. 714/6; 714/2
(58) Field of Classification Search .................. 714/6, 714/2, 4, 11–13
See application file for complete search history.

(56) References Cited

U.S. PATENT DOCUMENTS

| | | | |
|---|---|---|---|
| 5,469,573 A | 11/1995 | McGill et al. | 717/127 |
| 5,708,776 A * | 1/1998 | Kikinis | 714/55 |
| 5,835,911 A | 11/1998 | Nakagawa et al. | 707/203 |
| 5,940,871 A | 8/1999 | Goyal et al. | 711/206 |
| 6,145,088 A | 11/2000 | Stevens | 714/2 |
| 6,173,417 B1 | 1/2001 | Merrill | 714/15 |
| 6,195,695 B1 * | 2/2001 | Cheston et al. | 709/221 |
| 6,199,179 B1 | 3/2001 | Kauffman et al. | 714/26 |
| 6,393,585 B1 | 5/2002 | Houha et al. | 714/23 |
| 6,560,726 B1 | 5/2003 | Vrhel et al. | 714/55 |
| 6,728,896 B1 * | 4/2004 | Forbes et al. | 714/4 |
| 6,915,420 B2 * | 7/2005 | Hensley | 713/2 |
| 2002/0188836 A1 * | 12/2002 | Gurumoorthy et al. | 713/1 |
| 2004/0003222 A1 * | 1/2004 | Rich et al. | 713/1 |

* cited by examiner

*Primary Examiner*—Dieu-Minh Le (57) ABSTRACT

An improved operating system method that, in addition to the primary operating system, stores one or more alternate or recovery operating systems. The system monitors the operation of the present operating system and accesses the alternate or recovery operating system based on a fail-over algorithm when a fault condition is detected. The alternate or recovery operating systems are periodically updated.

41 Claims, 7 Drawing Sheets

| BYTES | DESCRIPTION |
|---|---|
| 88 | NON-VOLATILE STORAGE AVAILABLE FOR THE OS TO MAINTAIN SYSTEM STATE ACROSS BOOTS |
| 24 | RESERVED |
| 4 | DISK ID FOR BOOT COUNTER #1 |
| 4 | DISK ID FOR BOOT COUNTER #2 |
| 4 | DISK ID FOR BOOT COUNTER #3 |
| 4 | DISK ID FOR BOOT COUNTER #4 |
| 4 | BOOT COUNTER #1 |
| 4 | BOOT COUNTER #2 |
| 4 | BOOT COUNTER #3 |
| 4 | BOOT COUNTER #4 |

Fig.6

| 4 BITS | 4 BITS | 4 BITS | 4 BITS | 12 BITS | 4 BITS |
|---|---|---|---|---|---|
| X | Y | Z | W | UNDEFINED | COUNT VALUE |

| BOOT COUNTER X,Y,Z,W COUNT | | | | OPERATING SYSTEM INTERPRETATION |
|---|---|---|---|---|
| #1 | #2 | #3 | #4 | |
| 0,0,0,1 1 | 0,0,1,1 0 | 0,0,2,1 0 | 0,0,3,1 0 | NORMAL BOOT OF MAIN OPERATING SYSTEM FROM ATA DISK 0, PARTITION 1. FIRST PARTITION ON ATA DISK 1 IS MIRROR BACKUP OS. FIRST PARTITION ON ATA DISK 2 IS UPDATED BACKUP PARTITION. FIRST PARTITION ON ATA DISK 3 IS FIRST BOOT OS. |
| 0,0,0,1 2 or 3 | 0,0,1,1 0 | 0,0,2,1 0 | 0,0,3,1 0 | RETRY OF MAIN OPERATING SYSTEM AFTER FAILED BOOT ATTEMPT. |
| 0,0,0,1 3 | 0,0,1,1 1 | 0,0,2,1 0 | 0,0,3,1 0 | FIRST BOOT ATTEMPT OF FIRST BACKUP OPERATING SYSTEM. |
| 0,0,0,1 3 | 0,0,1,1 2 or 3 | 0,0,2,1 0 | 0,0,3,1 0 | RETRY OF FIRST BACKUP OPERATING SYSTEM AFTER FAILED BOOT ATTEMPT |
| 0,0,0,1 3 | 0,0,1,1 3 | 0,0,2,1 1 | 0,0,3,1 0 | FIRST BOOT ATTEMPT OF SECOND BACKUP OPERATING SYSTEM. |
| 0,0,0,1 3 | 0,0,1,1 3 | 0,0,2,1 2 or 3 | 0,0,3,1 0 | RETRY OF SECOND BACKUP OPERATING SYSTEM AFTER FAILED BOOT ATTEMPT |
| 0,0,0,1 F | 0,0,1,1 3 | 0,0,2,1 0 | 0,0,3,1 0 | FIRST BOOT ATTEMPT OF FIRST BACKUP OPERATING SYSTEM AFTER MAIN DISK HAS FAILED AND IS NO LONGER VISIBLE TO THE SYSTEM. |
| 0,0,0,0 0 | 0,0,0,0 0 | 0,0,0,0 0 | 0,0,0,0 0 | NORMAL BOOT OF NON-INTERNAL HARD DRIVE BOOT DEVICE (e.g. FLOPPY, CD, NETWORK) |

OPERATING SYSTEM UPDATE AND BOOT FAILURE RECOVERY

CROSS REFERENCE TO RELATED APPLICATIONS

This is related to co-pending application entitled "Operating System Update and Boot Failure Recovery" filed by Karl Denninghoff, Raju Gulabani, Mukesh Karki, Clark Nicholson, and Neel Malik on Sep. 26, 2000, Ser. No. 09/669,349, which document is hereby expressly incorporated by reference.

TECHNICAL FIELD

The invention relates generally to operating systems such as those resident on computer servers and in particular to operating systems on headless servers or servers in applications having little or no local end user interface capabilities.

BACKGROUND OF THE INVENTION

Servers are an important component to many computer networks, connecting many work stations, or clients, to a centralized source of software, memory, and system management. While servers provide many benefits in terms of cost and simplicity of linking of work stations, server failure may result in numerous clients becoming inoperative. Troubleshooting server failure is a difficult task. Often the end user of a server does not have the technical savvy to determine the cause of the server's failure and bring the server back on line. Some servers are "headless" meaning that they do not have a monitor or other user interface connected to them. Therefore, it is standard practice for an end user to simply send a server back to the manufacturer for service rather than attempt to fix it on site. While the server is out for repairs, an entire network may be rendered useless.

SUMMARY OF THE INVENTION

The present invention provides an operating system update and boot failure recovery system whereby a server experiencing an operating system failure, such as during boot or update, automatically restarts using an alternate operating system. According to an exemplary embodiment, multiple alternate operating systems are maintained that are updated at various intervals to provide additional options in the event of operating system failure.

The method of the present invention provides a primary and one or more alternate bootable operating systems in storage accessible by a computing system, preferably a server. During normal operation the computing system accesses the primary operating system. The method monitors the operation of the primary operating system and accesses the alternate operating system upon sensing an error in the operation of the primary operating system.

The described fail-over recovery system includes a primary operating system stored in a first memory partition and at least one alternate operating system stored in corresponding memory partitions. An operating system table that lists each operating system, its location, and an order in which the alternate operating systems should be accessed is maintained. Boot control instructions access the operating system table to determine which operating system should be booted to control the computing system.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE PREFERRED EMBODIMENTS

Figure 1:
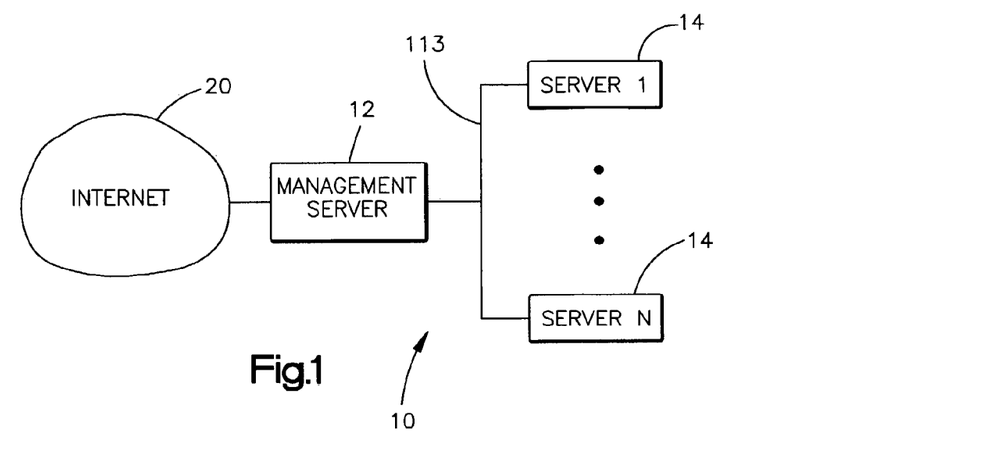
FIG. 1 is a schematic of a network of computers wherein one server computer is coupled to multiple client computers.

Turning to the drawings, FIG. 1 is a schematic depiction of a computer network 10. The network 10 is shown as having a single server computer 12 and a number of client computers 14. In the following description it is assumed that the invention is practiced with respect to the server operating system, however, it is contemplated that practice of the invention is suitable for use with any of the computers 12, 14 shown.

Figure 2:
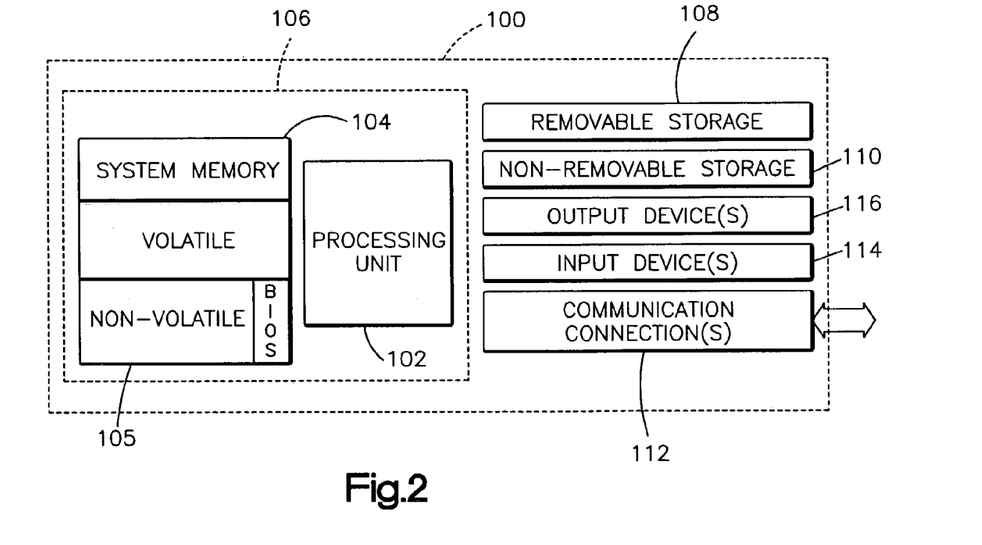
FIG. 2 is a schematic depiction of components of a representative computer coupled to the network shown in FIG. 1.

The network 10 includes a plurality of computing nodes each of which includes a computing device. One of the computing devices is a server computer and a number of other computing devices are client computers. An exemplary computing device 100 is shown in FIG. 2 and includes components described in more detail below.

In its most basic configuration, the computing device 100 typically includes at least one processing unit 102 and memory 104. Depending on the exact configuration and type of computing device, the memory 104 may be volatile (such as RAM), non-volatile (such as ROM, flash memory, etc) or some combination of the two. This most basic configuration is illustrated as shown as forming a module or component 106 in FIG. 2.

The computing device 100 may also have additional features/functionality. For example, the computing device 100 may also include additional storage (removable and/or non-removable) including, but not limited to, magnetic or optical disks or tape. Such additional storage is illustrated in FIG. 1 by removable storage 108 and non-removable storage 110. The computer storage media includes volatile and non-volatile, removable and non-removable media implemented in any method or technology for storage of information such as computer readable instructions, data structures, program modules or other data. The memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 100.

In order to communicate over the network the computing device contains a communications connection 112 that allows the device 100 to communicate with other devices on the network 10. The communications connection 112 includes an interface to a communications media. A communications media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communications media includes the physical layer of the hardware for carrying signals on wire media such as a wired network or wireless media such as acoustic, RF, infrared and other wireless media. Network links 113 between computing devices in the FIG. 1 network depiction are implemented using some or all of the aforementioned communications media. The term computer readable media as used herein includes both storage media and communications media.

The computing device 100 may also have input devices(s) 114 such as keyboard, mouse, pen, voice input device, touch input device, etc. Output devices 116 such as a display, speakers, printers, etc may also be included. All these devices are well known in the art and need not be discussed at length herein. It is noted that the server computing device in FIG. 2 may be configured without a video display or keyboard input. In such a circumstance control functions and setup on the server are performed by an interface to the server available through one of the client computers. To set up the network 10, special server software is installed on the server computer 12 at manufacture and corresponding client software is installed on the multiple clients 14 at set up.

Overview

In addition to a primary operating system stored for access by the computing system, one or more alternate bootable operating systems are stored either in resident memory on an external disk. The time required to complete a boot procedure is monitored and an error is sensed when the time required exceeds a predetermined limit. The alternate operating system is accessed automatically or manually by a user after a certain number of errors in the operation of the primary operating system are sensed.

The alternate operating system may be a bootable copy of the primary operating system that is stored when the computing system is first booted, thereby creating a first boot alternate operating system. The alternate operating system may be a bootable copy of the primary operating system that is overwritten using an imaging technique with a current version of the primary operating system at periodic intervals (such as some number of boots since last update) to create an updated operating system. The alternate operating system may be a bootable copy of the primary operating system that is a real time copy of the primary operating system created using RAID 1. The alternate operating system may be a recovery operating system that has instructions for converting a non-bootable shadow copy of the operating system to a bootable version upon sensing an error in the operation of the primary operating system.

A list of locations of operating systems is maintained that lists the operating systems in an order in which they should be accessed in the event that an error is sensed in the present operating system. Boot instructions direct the computing system to access an operating system by referring to the list of locations of alternate operating systems. The list of locations of operating systems may be initialized by detecting operating systems, storing the locations of the operating system in a fail-over memory location in non-volatile RAM memory according to an order in which they are to be accessed, and associating an boot counter with each operating system.

DESCRIPTION OF THE PREFERRED EMBODIMENTS

Figure 3:
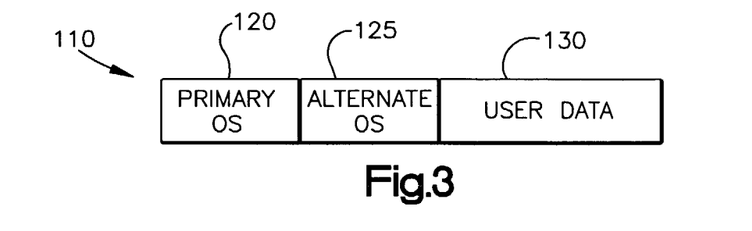
FIG. 3 illustrates a memory allocation scheme in accordance with an embodiment of the present invention.

Referring now to FIG. 3, an allocation of the storage 110 (FIG. 2) for a server computer in accordance with an embodiment of the present invention is depicted. A primary operating system segment 120 of the memory contains the instructions necessary for starting the server when the server is powered up or restarted. In accordance with the present invention, an alternative operating system segment 125 is provided within the storage 110. A third general partition of memory is allocated for user data 130.

In one embodiment, the primary operating system and alternate operating system are exact duplicates of one another when the server is shipped. In normal operation, the server accesses the primary operating system during start up. If no server start up failures occur, the server would not access the alternate operating system. In the event of a server failure, the server accesses the alternate operating system and uses the instructions therein to start the server. In an exemplary embodiment, the contents of the alternate operating system would remain the same as when the server shipped to ensure that the alternate operating system does not become corrupted. As the primary operating system is updated, it may deviate from the alternate operating system. In this case a server start in the alternate operating system may result in a limitation of available features, however, limited operation in a truly uncompromised alternate operating system is preferable to a non-functioning server. Alternate embodiments may provide for periodic updating of the alternate operating system if the integrity of the updated operating system can be assured.

Figure 4:
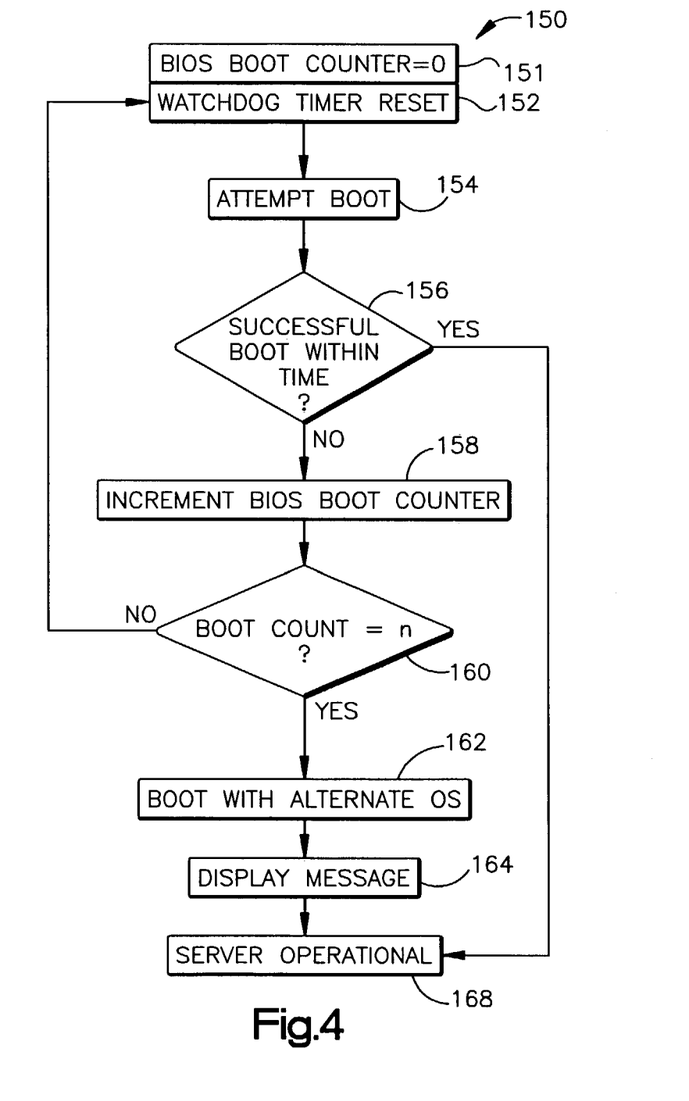
FIG. 4 illustrates a flow diagram of the operation of an operating system update and boot failure recovery system in accordance with the present invention.

Referring to FIG. 4, a flow chart depicting an embodiment of an operating system update and boot failure recovery system in accordance with the present invention is illustrated. A BIOS boot counter is set to 0 in step 151. A value "n" is chosen for the number of failed boot attempts the system will require before switching to the alternate operating system. A watchdog timer is reset in step 152. The watchdog timer is a common feature in computer hardware. The watchdog is a countdown counter that attempts to reset the processing unit once a predetermined amount of time has passed. The watchdog timer may be part of the computer hardware and is configured and started by the BIOS immediately before booting the operating system. The operating system is responsible for continuously restarting the countdown timer to avoid a processing unit reset. In this way the watchdog timer is used to monitor the boot process and if the boot is unsuccessful, the processing unit is reset.

An alternative method of determining the success or failure of the boot process that does not require a watchdog timer is for the BIOS to simply set a location in NVM to a specific value and instruct the operating system to clear it. The BIOS checks this memory location before it attempts to boot and if the memory location is clear, the previous boot was unsuccessful. Variations of this include using the BIOS to set the NVM to a specific value and then this value is decremented or changed at various points in the boot process eventually reaching 0 to indicate complete boot success. In this way the BIOS may not only determine that a boot was unsuccessful but it can also determine at which point in the boot process a failure occurred. The BIOS communicates with the primary and alternate operating systems using solid state non volatile read/write memory such as EEPROM or Flash memory.

In the embodiment depicted in FIG. 4, BIOS has been altered to include a boot counter as well as instructions for finding the alternate operating system in the event of primary operating system failure. Any time an externally triggered boot occurs, the boot counter is reset to zero. The system attempts to boot the server using the primary operating system in step 154. If the system starts successfully within the time allotted by the watchdog timer, the server begins normal operation (steps 156 and 168). If the watchdog timer times out before the server boots successfully, the boot counter is incremented (step 158), compared to n (step 160), and if the system has not yet failed n times again attempts to boot the server using the primary operating system (steps 152 and 154). Once the system has failed to boot using the primary operating system n times, the BIOS accesses the alternative operating system (that is typically stored on the computing devices' fixed disk) in step 162 to boot the server. A message is displayed to the user in step 164 to notify them that they are operating in a back up operating system mode and to seek service as soon as possible.

In an alternate embodiments of the invention, instead of storing the alternate operating system in storage 110, a disk may be provided containing the alternate operating system or instructions to select the alternate operating system. The user would be prompted to insert the disk and restart the machine at step 162 in FIG. 4. In another embodiment, a local hardware interface such as a restart button may be provided to allow the user to start in the alternate embodiment when necessary.

In an exemplary embodiment of the present invention, the alternate operating system contains a copy of the primary operating system either in a compressed or uncompressed form. When the system boots with the alternate operating system, the alternate operating system attempts to restore the primary operating system by storing the new copy in the location of the primary operating system. When the system is rebooted, it will use the "new" primary operating system if the attempt to restore was successful. In an alternate embodiment, the server switches between operating systems, using one system until it faults, then restoring the faulted operating system and using the alternate operating system until it faults and so on.

While the above description focused on server failures during booting, the operating system update and boot failure recovery system of the present invention could be invoked by a software update monitoring component that initiates the operating system update and monitors the update progress. In case of an update failure, the operating system update and boot failure recovery system would be invoked to bring the operating system back to a consistent state.

In an embodiment of the invention, the alternate operating system is periodically updated with the current state of the primary operating system, provided that the primary operating system is in a known state. In this embodiment, when the primary operating system fails, the server switches to an operating system that represents the last known state of the primary operating system.

Fail-Over Operating System with Updated Alternative Operating Systems

Figure 5:
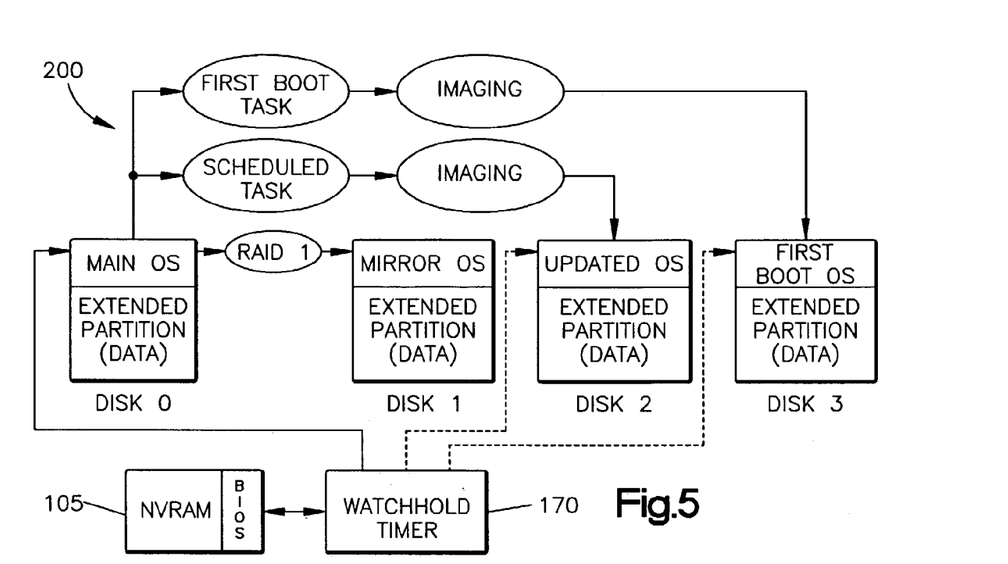
FIG. 5 is a block diagram of a fail-over operating system according to an embodiment of the present invention.

An enhanced system for providing an operating system fail-over feature 200 is illustrated in FIG. 5. For the purposes of this description, four separate hard disks (Disk 0-Disk 3) are included in the system, however it will be apparent to one of skill in the art that the various operating systems can be stored in multiple partitions of the same disk or that more than four disks could be included in the system. In addition, it is contemplated that the specific versions of the operating system that are stored on the disks could be varied within the scope of the invention depending on user needs.

Each disk is partitioned into at least two partitions, one that stores a version of the operating system and an extended partition that stores data. The primary operating system resides on Disk 0 and is the most current operating system. The primary operating system is the first operating system to be tried during system boot and includes all revisions that have been made to the operating system.

Disk 1 stores a mirror operating system that is a real-time updated mirror image of the primary operating system. The mirror operating system is created using a RAID 1 technique or other suitable technique for creating a real-time mirror of data in another location. A RAID 1 mirror set is created that consists of the first partitions on Disk 0 and Disk 1. This automatically creates a real-time image of the primary operating system on Disk 0 in the first partition on Disk 1.

Disk 2 stores an updated operating system that is updated periodically. For example, the updated operating system could be created by a scheduled task runs on every boot and creates a shadow copy image of the primary operating system on the first partition of Disk 2. Thus, the updated operating system is a "last known good" boot image of the primary operating system. As an alternative, the user could create a scheduled task to create a shadow copy of the primary operating system on a user-defined schedule. Another alternative is that the user manually creates a shadow copy of the primary operating system on Disk 2. Yet another alternative is that a software service detects whenever new software is being installed on the system and creates a shadow copy before the software is installed. In this embodiment, if the software corrupts the system it will automatically fail back to the state before the installation.

Disk 3 stores a first boot operating system that represents the condition of the operating system at the first boot of the system. A scheduled task runs on first boot and creates this operating system by imaging the primary operating system to the first partition of Disk 3. This automatically preserves the factory preset image of the primary operating system.

With the various operating systems residing on the four disks as described, the system can recover from both hardware failures and software corruption. If Disk 1 fails due to hardware problems, the system automatically reboots from the mirror copy of the primary operating system stored on Disk 1. If the system fails in both the main and mirror operating systems due to a virus or other software corruption, the system automatically reboots using the updated operating system on Disk 2. In the event of second level software corruption causing the primary operating system, the mirror operating system on Disk 3, and the updated operating system to fail, the first boot operating system can restore basic operation of the system to prevent complete shutdown and to facilitate troubleshooting and repairs.

Figure 6:
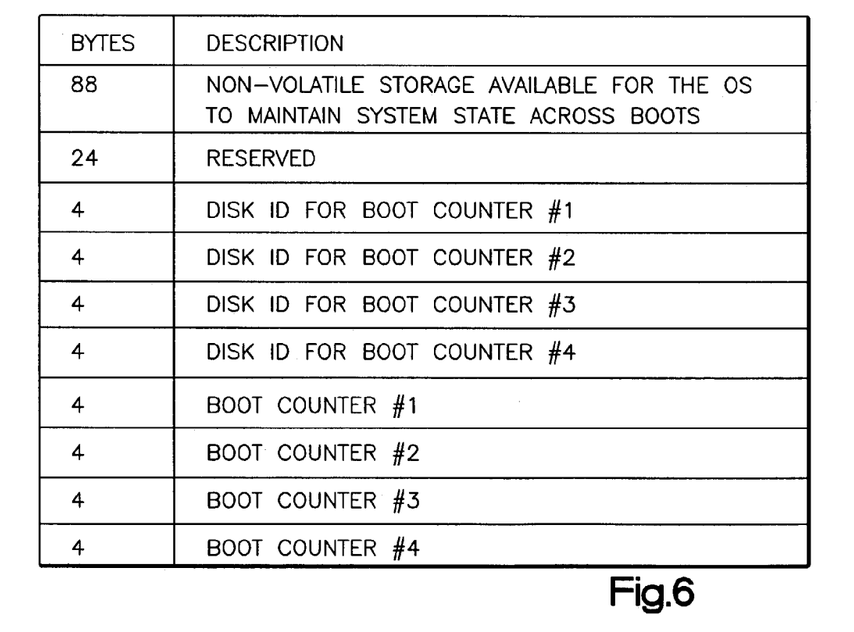
FIG. 6 is a table listing of the contents of certain memory locations in NVRAM according to an embodiment of the present invention.
Figure 7:
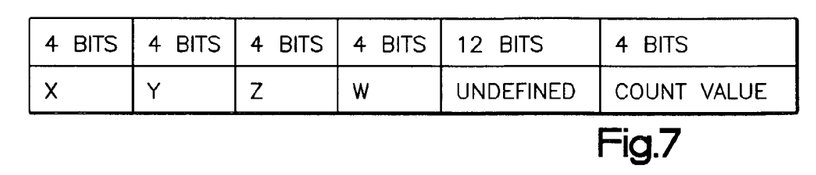
FIG. 7 is a block representation of a format for a boot counter according to an embodiment of the present invention.

The four versions of the operating system just described are accessed by BIOS upon system boot based on the condition of four boot counters that are created in NVRAM 105 as shown in FIG. 6. The NVRAM provides a minimum of 128 bytes of storage, the first 88 of which are for the operating system to use to store state information. This memory is modified only by the operating system using an associated NVRAM driver. The last 16 bytes of the NVRAM are for storing the four boot counters. FIG. 7 illustrates a preferred format for each of the 4 byte boot counters and their corresponding Disk IDs. X,Y, Z, and W are the values for the arc path before fail-over occurs as defined in MSDN and KB article Q102873 although the value of X can take values other than 0 according to this operating system fail-over method. Disk IDs are quasi universally unique identifiers that are typically stored in the master boot record on each disk. The disk IDs are stored in NVRAM for each boot counter so that the operating system can determine which disk applies to which counter after a fail-over occurs.

In addition to the NVRAM requirements just discussed, the fail-over method relies on a hardware watchdog timer (170 in FIG. 5). The watchdog hardware will count down from a configurable value and reset or shut down the system if the count reaches zero. Operating system services will periodically restart the timer so that if the operating system, drivers, or services stop functioning, the system will be automatically restarted or shut down.

The BIOS must be able to read and write to each boot counter during boot. The operating system must be able to read and write to each boot counter using the associated NVRAM driver. The operating system will read these boot counters and determine the state of the fail-over based on their values as defined in the table of FIG. 9. The BIOS increments and maintains the boot counters according to the method set forth in FIG. 8.

Figure 8A:
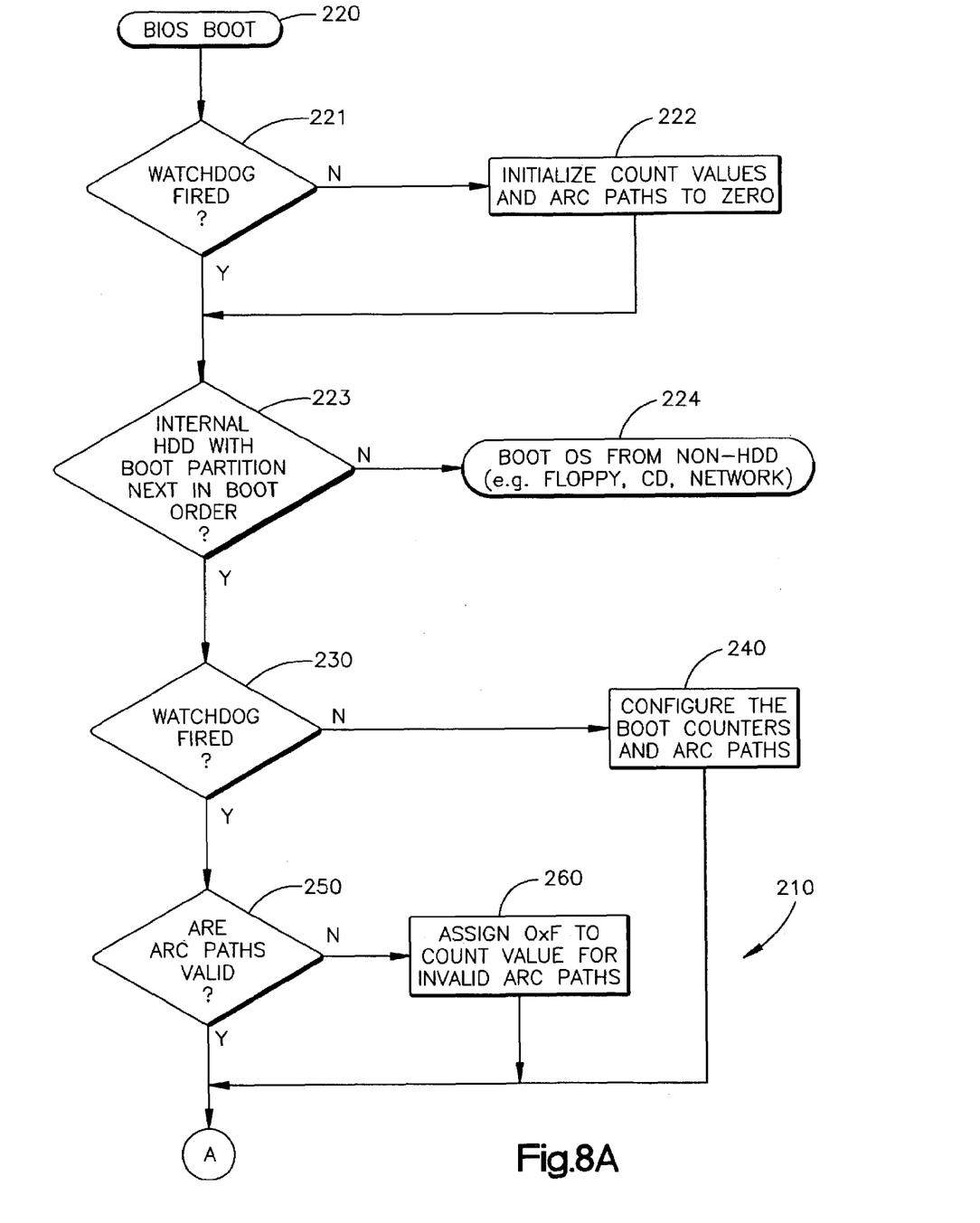
FIGS. 8A and 8B are a flow diagram of a fail-over algorithm according to an embodiment of the present invention.

When a BIOS boot occurs in step 220, the method checks to see if the boot was caused by the watchdog timer. If the boot was not caused by the watchdog timer, the BIOS initializes all boot counter arc paths and count values in NVRAM to zero in steps 221 and 222. If the boot was caused by the watchdog timer, the boot counters are not modified. If the next boot device is not an internal hard disk drive with a valid active partition (step 223), the BIOS boots that device and the algorithm ends in step 224. If the next boot device is an internal disk drive with a valid active partition, the algorithm continues at step 230.

The method checks to see if the boot was caused by the watchdog timer in step 230. If the boot was not caused by the watchdog timer, BIOS configures the boot counters for internal disk fail over in step 240. To configure the counters, the BIOS searches the internal disks in boot order, as defined in the BIOS setup, and uses the first valid active partition as the primary operating system partition. The primary operating system partition (in this case Disk 0, partition 1) is assigned the first boot counter in NVRAM, the arc path of the primary operating system (as defined in MSDN knowledge base article Q102873) is written to the boot counter as shown in the first row and column of FIG. 9, for example. The BIOS then searches for up to three bootable backup partitions. It searches first by disk, based on the standard disk enumeration order for SCSI or ATA, and then searches by partition, based on the order in the partition table on each disk's master boot record. The first three partitions that have a system ID in the partition table equal to 0x07 (Primary NTFS partition) or 0x87 (primary NTFS RAID 1 partition) are considered to be bootable backup partitions. Each backup partition is assigned the next available boot counter in NVRAM, the arc path of the partition is written to the boot counter, and the count value is set to zero (see first row, columns 2-4 in FIG. 9). If there are fewer than three bootable backup partitions, the arc path for the unused boot counters is set to all ones.

If it is determined in step 230 that the watchdog timer has caused the boot, step 240 is bypassed and the boot counter assignments are not modified. This allows the operating system to determine that a fail-over has occurred when a disk fails and is no longer visible to the BIOS. If the watchdog timer has fired, in step 250 the BIOS reads the arc paths for all boot counters and validates that the disks and partitions are still present in the system. For all invalid arc paths, the count value is set to 0xF for that partition (see FIG. 9 second to last row).

Figure 8B:
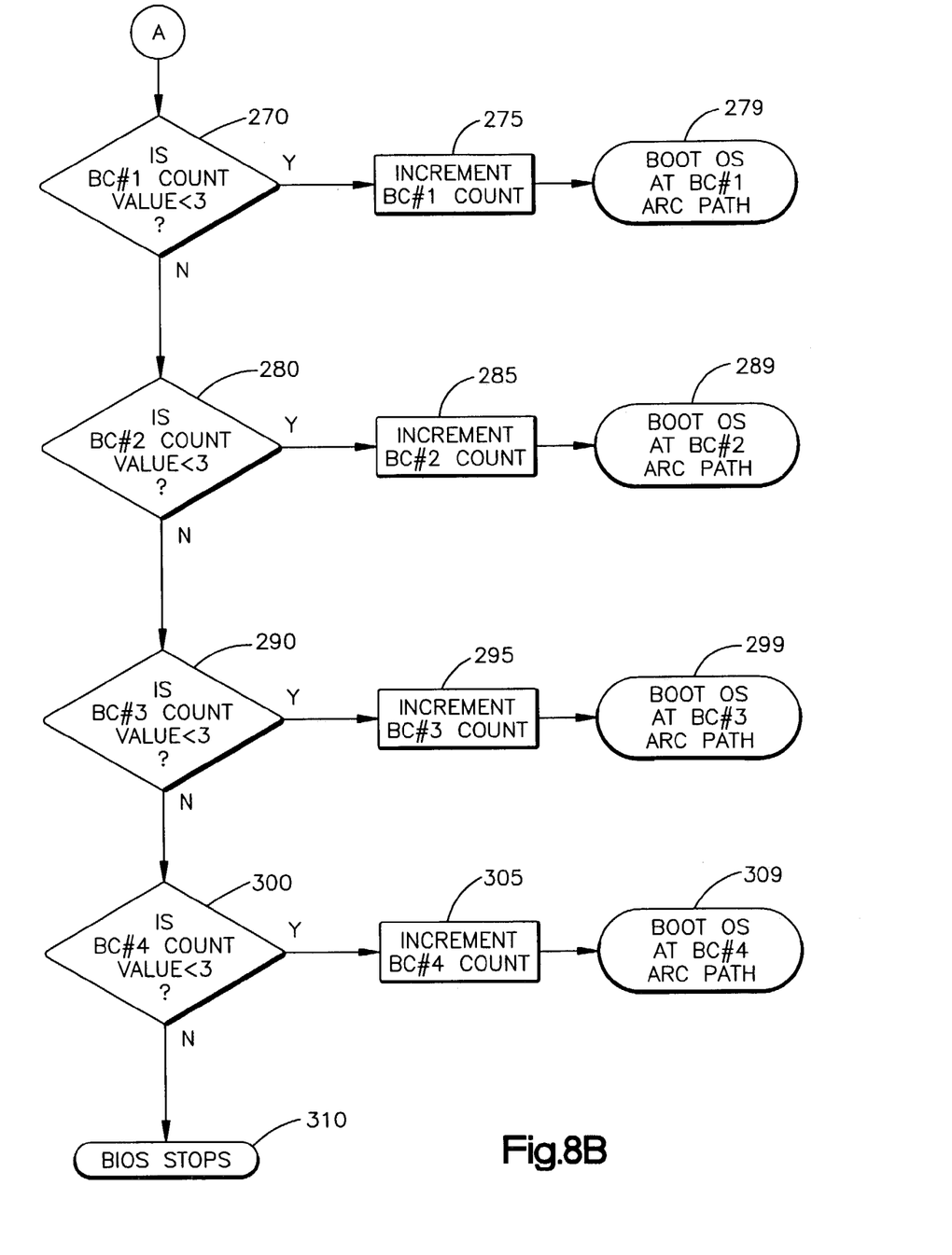
Figure 9:
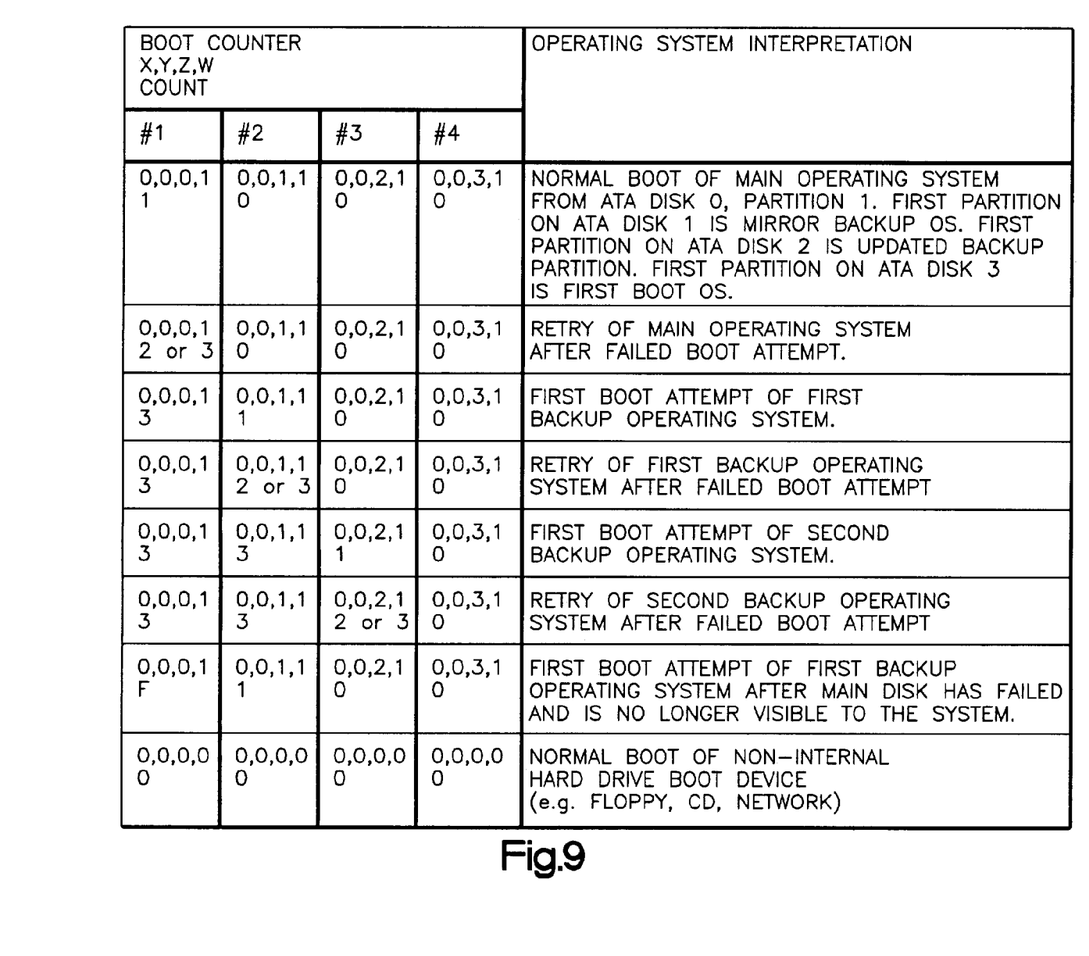
FIG. 9 is a table listing of the contents of boot counters during execution of a fail-over operating system according to an embodiment of the present invention.

In steps 270-309 of FIG. 8 and rows 2-6 of FIG. 9, the BIOS determines the partition to boot next by searching for the next available boot counter that has a valid arc path and a counter value less than 3. Immediately before turning control over to the operating system loader, the BIOS sets the disk ID to 0x80 and increments the count value associated with the partition that will be booted.

In step 310, if all valid partitions have count values greater than or equal to 3, the watchdog timer is stopped, the boot failure icon is displayed on the local display, and the BIOS stops until someone cycles power on the device.

EXAMPLES

The described BIOS fail-over system will handle the following scenarios as set out in these examples. In all scenarios there are four disks and versions of the operating system as already described stored in the first partition of each disk.

First Scenario: The primary operating system becomes corrupt due to installation of a bad driver, power failure during write to disk, or intermittent IDE or SCSI cable, and is no longer bootable. Result: The primary operating system bug checks. The watchdog timer fires and forces a reboot. The BIOS attempts to reboot the primary operating system two more times and the watchdog timer fires each time. The BIOS then boots the mirror operating system from Disk 1. After the mirror operation, which is also corrupted, is booted three times the system fails over to Disk 3, which is a last known good boot and the boot counter values are set as follows (values in hexadecimal):

| | |
|---|---|
| Boot Counter#1: arc path = 0, 0, 0, 1 | count = 3 |
| Boot Counter#2: arc path = 0, 0, 1, 1 | count = 3 |
| Boot Counter#3: arc path = 0, 0, 2, 1 | count = 1 |
| Boot Counter#4: arc path = 0, 0, 3, 1 | count = 0 |

Second Scenario: Disk 0 fails to the extent that it is no longer visible to the BIOS. Result: The primary operating system will bug check. The watchdog timer fires and forces a reboot. The BIOS sees that the Disk 0 no longer exists and boots the active partition on Disk 1. During this process, the boot counter assignment does not change. Boot counter 1 is assigned to Disk 0, first partition, and boot counter 2 is assigned to Disk 1, first partition. After the backup operating system is booted, the boot counter values are set as follows:

| | |
|---|---|
| Boot Counter#1: arc path = 0, 0, 0, 1 | count = F |
| Boot Counter#2: arc path = 0, 0, 1, 1 | count = 1 |
| Boot Counter#3: arc path = 0, 0, 2, 1 | count = 0 |
| Boot Counter#4: arc path = 0, 0, 3, 1 | count = 0 |

Third Scenario: Disk 0 is intentionally removed from the system by the user and then the system is booted. Result: The BIOS sees that Disk 0 no longer exists and boots the active partition on Disk 1. During this process, the boot counter assignment changes. Boot counter 1 is reassigned to the Disk 1, first partition, boot counter 2 to Disk 2, boot counter 3 to Disk 3 and boot counter 4 becomes unassigned as shown below:

| | |
|---|---|
| Boot Counter#1: arc path = 0, 0, 1, 1 | count = 1 |
| Boot Counter#2: arc path = 0, 0, 2, 1 | count = 0 |
| Boot Counter#3: arc path = 0, 0, 3, 1 | count = 0 |
| Boot Counter#4: arc path = F, F, F, F | count = 0 |

User Interface for Fail-Over Notification

When the fail-over system performs a boot on an operating system other than the primary operating system, an alert to this fact is added as an event log entry. Various alert messages and icons can be displayed on local and remote user interfaces and email, phone messages, and other notifications may be sent.

Client Personal Computer Fail-Over System

Figure 10:
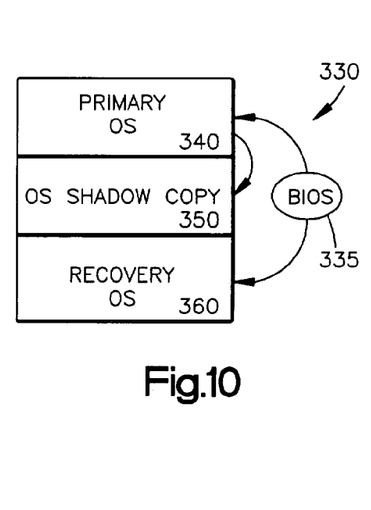
FIG. 10 is a block diagram of a fail-over system according to an embodiment of the present invention.

The fail-over system has been described with respect to unattended servers. A simplified version that that does not require a watchdog timer can be used for client personal computer 330 is shown in FIG. 10. Because of the level of user interaction in the PC environment, the PC fail-over system might not use a watchdog timer or automatically reboot using alternate operating systems. Rather, the primary operating system 340 would periodically make "shadow copy" of itself 350 and store the shadow copies in a predetermined location. In the event of a failed boot, the system could boot to a special recovery operating system 360 that prompts the user with various recovery options including the creation of a bootable operating system from a shadow copy file 350 stored in the predetermined location. The user could also be given the option of running a diagnostic program, repairing the primary operating system, or contacting service personnel.

While the client personal computer fail-over system may provide the option of creating a bootable operating system from the shadow copy file 350, in a streamlined version, the fail-over system provides a user-friendly environment where the user can recover the system to a working state. Rather than providing an alternative operating system for the user to perform daily tasks, or recover from hardware failures, this version provides options for recovering from software-based errors that could prevent the system from booting.

Figure 11:
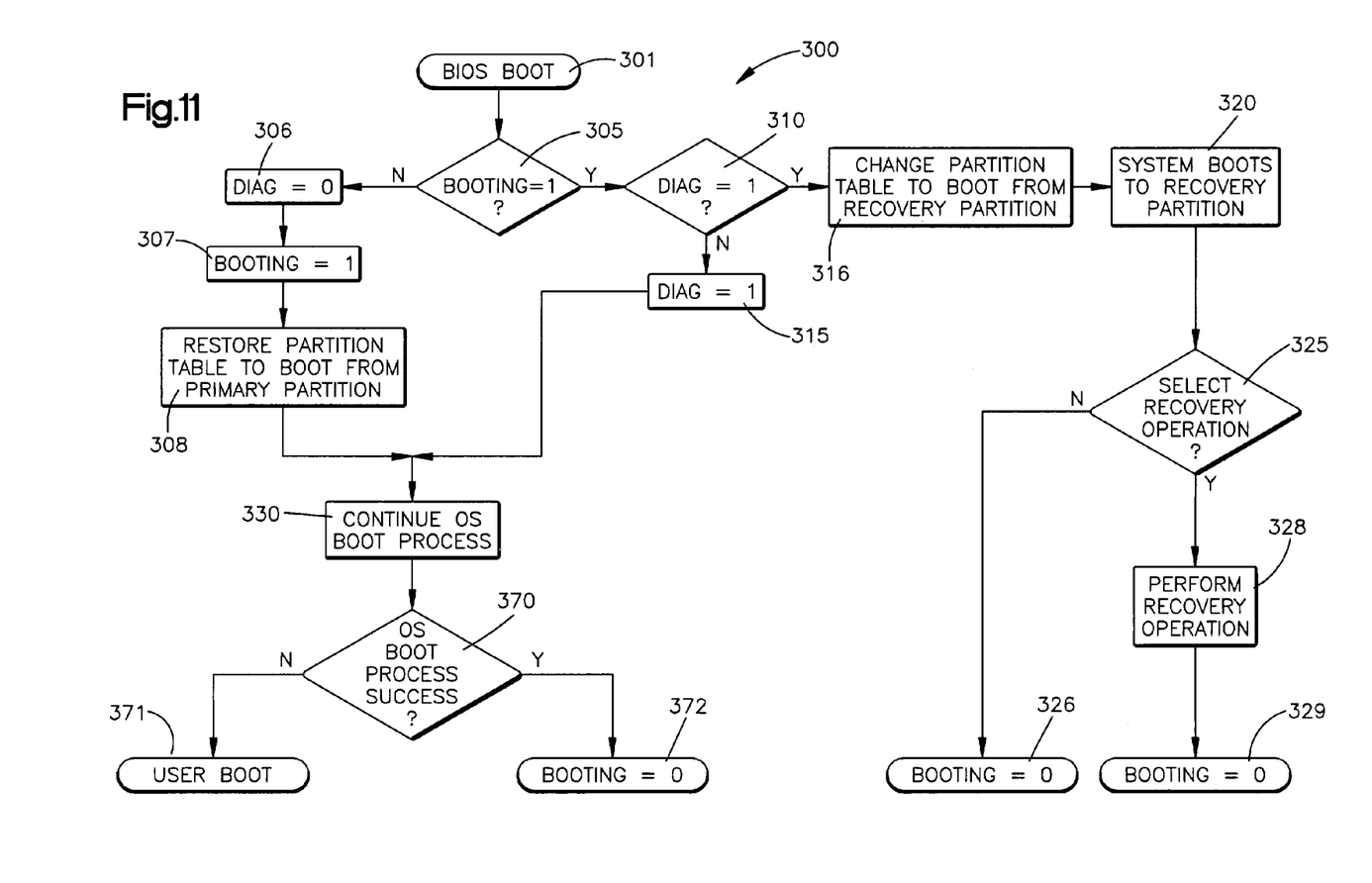
FIG. 11 is a flow chart of an alternative embodiment of the fail-over system.

FIG. 11 is a flowchart representation of the client personal computer fail-over method 300. To implement the method, the BIOS must be able to detect whether the two previous attempts to boot from the main partition have failed. If so, the BIOS must be capable of booting the system into the recovery environment. One mechanism that the BIOS can implement to determine whether the two previous boot attempts were unsuccessful is a Simple Boot Flag (SBF). The SBF tracks successful and unsuccessful boot attempts. To use this mechanism, the BIOS sets a bit when it finishes execution. The operating system is responsible for clearing the bit after a successful boot. If the BIOS finds the bit already set, the previous boot was unsuccessful. The SBF ensures that the BIOS diagnostics tests can be run only when necessary, but can also be used to boot the system into the recovery environment.

To use the Simple Boot Flag for the fail-over system, two bits of an eight bit SBF register are used. Bit 1 (BOOTING) is used to indicate whether or not the previous boot was completed. The system firmware must check the state of this flag at the beginning of POST (step 305). If BOOTING is clear, then the last boot attempt was successful (see steps 372, 326, and 329) and DIAG will be cleared (step 306) to inform components to skip all tests and to begin loading the boot sector as soon as possible. BOOTING is set and the partition table is set to the main partition so that the system will boot from the primary operating system (step 308) and continue the operating system boot process in step 330. If the system boots successfully, the BOOTING is cleared by the operating system(step 372), if it does not, the system reboots (step 371)

If BOOTING is set the system firmware will set the diagnostic Bit 2 (DIAG) to 1 (step 315) to inform itself and other components to run a full diagnostic suite during the boot process (step 330) and boot into recovery mode during the next boot attempt (step 320). Once the system boots to the recovery partition, the user may select a recovery operation (steps 328-329) or attempt a reboot 326. In general, BOOTING is set at the earliest possible moment of POST and is cleared by the operating system after it has completed its boot procedure (steps 370-372 or 325-329).

After the fail-over is detected by the BIOS and it becomes necessary to boot from the recovery partition, the BIOS marks the recovery partition as active by modifying the partition table. The boot indication in the partition table for the recovery partition is changed from 0x00 to 0x80, the system ID is changed from 0x12 to 0x07, and the boot indicator of the main operation system partition is changed from 0x80 to 0x00. After the repair operation is complete, the boot indicators and the system ID are changed back to their original values.

The system fail-over system can be implemented on multiple hard disk drives with the primary disk drive contain the main operating system installation image and user data and the secondary disk containing the backup operating system and restore image. Alternatively, a single hard disk drive with at least two partitions can be used. The main, active partition contains the main operating system installation image and user data. The secondary partition is a hidden partition that contains the backup operating system and restore data. An optional third partition could be used for a backup copy of user data that could be restored to the main partition after the preinstallation image was restored. Because the secondary partition cannot be seen by the user or the operating system, it is protected against corruption by a virus or by accidental tampering by the user.

The recovery partition contains an installation of the operating system to provide a proper recovery environment to repair or replace the preinstallation image on the main partition and to clear the SBF after a repair to ensure that the system will then boot form the correct partition. Operating system profiles are used to lock down the recovery environment so that the user can perform only selected recovery operations to ensure that the integrity of the recovery environment is maintained and that the user cannot damage it in any way.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather that a restrictive sense.

We claim:

1. An improved operating system method comprising the steps of:
    storing a primary operating system on a first disk drive accessible by a computing system wherein during normal operation the computing system accesses the primary operating system so that the primary operating system is the present operating system; and wherein the primary operating system is a bootable operating system;
    storing a mirror operating system on a second disk drive accessible by the computing system wherein the mirror operating system is a mirror image of the primary operating system;
    storing an updated operating system on a third disk drive accessible by the computing system wherein the updated operating system is a last-known-good image of the primary operating system;
    storing a first-boot operating system on a fourth disk drive accessible by the computing system wherein the first-boot operating system is an image of the primary operating system at the time of a first boot of the primary operating system;
    monitoring the operation of the present operating system;
    based on a set of boot instructions, designating one of the mirror operating system, the updated operating system, and the first boot operating system as an alternate operating system; and
    accessing the alternate operating system upon sensing an error in the operation of the primary operating system so that the alternate operating system becomes the present operating system.

2. The method of claim 1 wherein the updated operating system is overwritten with a current version of the primary operating system at periodic intervals.

3. The method of claim 2 wherein the periodic intervals are determined based on a number of times the computing system has been booted since a prior overwrite.

4. The method of claim 2 wherein the updated operating system is stored by imaging the operating system.

5. The method of claim 1 wherein the mirror operating system is created using RAID 1.

6. The method of claim 1 wherein the step of monitoring the operation of the primary operating system is performed using a watchdog timer that monitors the operation of the present operating system being used by the computing system.

7. The method of claim 6 wherein the watchdog timer causes the computing system to boot based on the boot instructions when the present operating system is non-functional for a predetermined time period.

8. The method of claim 1 comprising the step of maintaining a list of locations of operating systems that lists the operating systems in an order in which they should be accessed in the event that an error is sensed in the present operating system and wherein the boot instructions direct the computing system to access an operating system by referring to the list of locations of alternate operating systems.

9. The method of claim 1 comprising the step of initializing a set of fail-over operating systems by detecting operating systems, storing the locations of the operating systems in a fail-over memory location according to an order in which they are to be accessed, and storing an associated boot counter in the fail-over memory location for each operating system.

10. The method of claim 9 wherein the fail-over memory location resides in non-volatile random access memory.

11. The method of claim 9 wherein the boot instructions comprise a fail over algorithm that increments the boot counter of the present operating system each time the present operating system is booted and wherein the algorithm directs the computing system to boot on a next stored operating system upon a predetermined value of the boot counter associated with the present operating system.

12. The method of claim 9 wherein the algorithm monitors a watchdog timer that resets upon operating system activity and directs the computing system to boot when the watchdog timer reaches a predetermined time value and wherein the algorithm increments the error counter each time the watchdog timer reaches the predetermined time value.

13. The method of claim 12 comprising the steps of, prior to the initializing step, validating currently stored operating system locations if the watchdog timer caused the most recent computing system boot and setting the boot counters of any invalid operating system locations to a predetermined value.

14. The method of claim 1 comprising the step of prompting a computing system user to access the alternate operating system upon sensing an error in the operation of the present operating system.

15. The method of claim 1 wherein the computing system is a headless server.

16. The method of claim 1 comprising the step of alerting a computer user that an alternate operating system has been accessed.

17. The method of claim 16 wherein the user is alerted by a visual cue on the computing device.

18. The method of claim 16 comprising the step of e mailing an alert message to the computer user.

19. The method of claim 1 wherein the alternate operating system is a recovery operating system for recovering the computing system to a working state.

20. The method of claim 19 wherein the step of accessing the alternate operating system upon sensing an error is performed by monitoring a boot bit that is reset at each successful boot.

21. The method of claim 20 comprising the step of monitoring a diagnostic bit that is set based on the value of the boot bit.

22. The method of claim 21 comprising the step of performing diagnostic tests on the operating system when the diagnostic bit is set.

23. The method of claim 20 wherein the recovery operating system is accessed when the boot bit is set.

24. The method of claim 21 wherein the recovery operating system is accessed when the boot bit and diagnostic bit are both set.

25. The method of claim 19 comprising the step of prompting a user to access the recovery operating system.

26. An improved operating system method comprising the steps of:
- storing a primary operating system on a first disk drive accessible by a computing system wherein during normal operation the computing system accesses the primary operating system as a present operating system so that the primary operating system is the present operating system;
- storing a plurality of alternate operating systems accessible by a computing system, the plurality of alternate operating systems including:
  - a mirror operating system stored on a second disk drive wherein the mirror operating system is a mirror image of the primary operating system,
  - an updated operating system stored on a third disk drive wherein the updated operating system is a last-known-good image of the primary operating system, and
  - a first-boot operating system stored on a fourth disk drive wherein the first-boot operating system is an image of the primary operating system at the time of a first boot of the primary operating system;
- storing a location and associated boot counter for each of the plurality of alternate operating system in an order in which the alternate operating systems are to be accessed;
- periodically updating the updated operating system;
- monitoring the operation of the present operating system;
- incrementing the boot counter of the present operating system each time an error is sensed in the operation of the present operating system; and
- accessing a next alternate operating system when the boot counter of the present operating system reaches a threshold value so that the next alternate operating system becomes the present operating system, wherein the next alternate operating system is one of the plurality of alternate operating systems.

27. For use with a computing system having a set of boot control instructions, a fail-over recovery system comprising:
- a plurality of operating systems including:
  - a primary operating system stored on a first disk drive,
  - a mirror operating system that is a mirror image of the primary operating system and that is one of a plurality of alternate operating systems, the mirror operating system stored on a second disk drive,
  - an updated operating system that is a last-known-good image of the primary operating system and that is one of the plurality of alternate operating systems, the updated operating system stored on a third disk drive, and
  - a first boot operating system that is an image of the operating system at a first boot of the primary operating system and that is one of the plurality of alternate operating systems, the first-boot operating system stored on a fourth disk drive; and
- an operating system table that lists each of the plurality of operating system, its location, and an order in which the alternate operating systems should be accessed;
- wherein the boot control instructions access the operating system table to determine which operating system should be booted to control the computing system as the present operating system.

28. The fail-over recovery system of claim 27 comprising a watchdog timer that monitors the functioning of the present operating system and generates an error signal when the present operating system becomes unresponsive for a predetermined amount of time that causes the boot instructions to boot the computing system.

29. The fail-over recovery system of claim 28 wherein the operating system table comprises a boot counter associated with each operating system that is incremented each time the computing system is booted using the operating system.

30. The fail-over recovery system of claim 29 wherein the boot instructions access a next alternate operating system based on the boot counter of the present operating system, wherein the next alternate operating system is one of the plurality of alternate operating systems.

31. The fail-over recovery system 27 comprising a mirroring module that creates a mirror of the present operating system for storage as one of the alternate operating systems.

32. The fail-over recovery system of claim 27 comprising an imaging module that creates an image copy of the present operating system at predetermined intervals for storage as an alternate operating system.

33. The fail-over recovery system of claim 27 comprising a first boot operating system storage module that stores a copy of the present operating system at the first boot of the computing system as an alternate operating system.

34. The fail-over recovery system of claim 27 wherein the operating system table is stored in non volatile random access memory.

35. An improved operating system method comprising the steps of:
- storing a primary bootable operating system on a first disk drive accessible by a computing system wherein during normal operation the computing system accesses the primary operating system as a present operating system so that the primary operating system is the present operating system;
- storing a plurality of recovery operating systems accessible by a computing system, the plurality of recovery operating systems including:
  - a mirror operating system stored on a second disk drive wherein the mirror operating system is a mirror image of the primary operating system,
  - an updated operating system stored on a third disk drive wherein the updated operating system is a last-known-good image of the primary operating system, and
  - a first-boot operating system stored on a fourth disk drive wherein the first-boot operating system is an image of the primary operating system at the time of a first boot of the primary operating system;
- storing a boot register for tracking the operating of the present operating system;
- monitoring the operation of the present operating system;
- setting a boot bit in the boot register upon computing system start and resetting the boot bit at each successful boot; and
- accessing one of the plurality of recovery operating systems when the boot bit is set at computing system start.

36. An improved operating system comprising;
- means for storing a primary bootable operating system in storage accessible by a computing system wherein during normal operation the computing system accesses the primary operating system so that the primary operating system is the present operating system;
- means for storing one or more alternate operating systems in storage accessible by the computing system, the one or more alternate operating systems including:

a mirror operating system that is a mirror image of the primary bootable operating system, an updated operating system that is a last-known-good image of the primary bootable operating system, and a first-boot operating system that is an image of the primary bootable operating system at the time of a first boot of the primary operating system;

means for monitoring the operation of the present operating system; and means for accessing at least one of the one or more alternate operating systems based on a set of boot instructions upon sensing an error in the operation of the primary operating system so that the at least one of the one or more alternate operating systems becomes the present operating system.

37. The improved operating system of claim 36 wherein the means for storing the one or more alternate operating systems stores a bootable copy of the primary operating system when the computing system is first booted, thereby creating the first-boot operating system.

38. The improved operating system of claim 36 wherein the means for storing the one or more alternate operating systems stores a bootable copy of the primary operating system that is overwritten with a current version of the primary operating system at periodic intervals to create the updated operating system.

39. The improved operating system of claim 36 wherein the means for storing the one or more alternate operating systems stores a bootable copy of the primary operating system that is the mirror operating system.

40. The improved operating system of claim 36 wherein the means for monitoring the operation of the primary operating system is a watchdog timer that monitors the operation of the present operating system being used by the computing system.

41. The improved operating system of claim 36 comprising means for maintaining a list of locations of operating systems that lists the operating systems in an order in which they should be accessed in the event that an error is sensed in the present operating system and wherein the boot instructions direct the computing system to access an operating system by referring to the list of locations of the one or more alternate operating systems.

* * * * *